United States Patent [19]

Chapman

[11] Patent Number: 4,573,661
[45] Date of Patent: Mar. 4, 1986

[54] MULTIPLE SCHEDULE VALVE

[75] Inventor: David N. Chapman, Rockford, Ill.

[73] Assignee: Sundstrand Corporation, Rockford, Ill.

[21] Appl. No.: 661,062

[22] Filed: Oct. 15, 1984

[51] Int. Cl.[4] .............................................. F16K 31/52
[52] U.S. Cl. ...................................... 251/234; 251/14; 251/58; 74/522
[58] Field of Search ................... 251/234, 14; 74/834, 74/522

[56] References Cited

U.S. PATENT DOCUMENTS

| 2,385,664 | 9/1945 | Warner | 251/234 X |
|---|---|---|---|
| 2,491,548 | 12/1949 | Branson | 236/92 |
| 2,736,212 | 2/1956 | Spence | 74/522 |
| 2,834,375 | 5/1958 | Gallo | 251/234 |
| 2,940,332 | 6/1960 | Teague, Jr. | 74/522 |
| 3,195,574 | 7/1965 | Carls | 137/625.69 |
| 3,258,229 | 6/1966 | Larson | 244/134 |
| 3,330,477 | 7/1967 | Stephens | 235/61 |
| 3,839,923 | 10/1974 | Dean | 74/522 |
| 4,431,369 | 2/1984 | Lucas | 415/36 |

FOREIGN PATENT DOCUMENTS

| 1059027 | 11/1953 | France | 251/234 |
| 1076075 | 4/1954 | France | 251/234 |

Primary Examiner—Samuel Scott
Assistant Examiner—Allen J. Flanigan
Attorney, Agent, or Firm—Wood, Dalton, Phillips, Mason & Rowe

[57] ABSTRACT

A multiple schedule valve including a valve seat and a valve member movable with respect thereto. A lever in the form of a bell crank is connected to the valve member and is movable on a pivot. A first actuator is connected to the lever to pivot the same to thereby move the valve member relative to the seat. A second actuator is connected to the pivot and is operable to shift the pivot axis thereof.

14 Claims, 4 Drawing Figures

MULTIPLE SCHEDULE VALVE

FIELD OF THE INVENTION

This invention relates to multiple schedule valves, that is, valves whose control of the flow of a fluid can be set according to two or more differing schedules in response to a single input for controlling the position of a valve member with respect to a valve seat.

BACKGROUND OF THE INVENTION

Prior art of possible relevance includes the following U.S. Pat. No. 2,491,548 issued Dec. 20, 1949 to Branson; U.S. Pat. No. 2,736,212 issued Feb. 28, 1956 to Spence; U.S. Pat. No. 2,940,332 issued June 14, 1960 to Teague, Jr.; U.S. Pat. No. 3,050,258 issued Aug. 21, 1962 to Rauh; U.S. Pat. No. 3,103,829 issued Sept. 17, 1963 to Basford; U.S. Pat. No. 3,195,574 issued July 20, 1965 to Carls; U.S. Pat. No. 3,203,446 issued Aug. 31, 1965 to Smirra; U.S. Pat. No. 3,243,155 issued March 29, 1966 to Valente; U.S. Pat. No. 3,258,229 issued June 28, 1966 to Larson; U.S. Pat. No. 3,330,477 issued July 11, 1967 to Stephens; U.S. Pat. No. 3,839,923 issued Oct. 8, 1974 to Dean; U.S. Pat. No. 3,891,164 issued June 24, 1975 to Hertrick et al; and U.S. Pat. No. 3,981,466 issued Sept. 21, 1976 to Shah.

There exists a number of instances where the flow of fluid through a single valve is desirably controlled according to two or more differing schedules utilizing but a single control actuator for positioning a valve member with respect to a valve seat. For example, according to one schedule, a control input will result in a valve being moved from a full closed to a full open position. According to another schedule, the same input could provide valve movement from a full closed position to a partially open position.

One specific area in which such a system may find use is in turbine engines utilized in aircraft. Frequently, in such engines, so-called "bleed air" from the compressor section is taken from the engine prior to its admission to the combustion section for anti-icing purposes. The compressed air will be hot and thus may be advantageously employed to de-ice or prevent the formation of ice, at the air inlet to the engine and conceivably other locations on the aircraft as well.

At the same time, during the start-up of a turbine engine, it is desirable to "unload" the compressor section of the engine so as to allow a given rotational speed of the turbine to be achieved with minimal energy allowing the use of a smaller and lighter weight starter motor and to minimize start-up power requirements.

In both such instances, the function to be controlled is the flow of bleed air. However, the ultimate function to be provided, anti-icing or compressor section unloading, are quite different and thus have different requirements for bleed air. While two different systems, one for anti-icing bleed air and one for compressor section unloading bleed air could be provided, weight concerns are not served if this approach is adopted.

Thus, there is a real need for a simple multiple schedule valve that may be adapted readily to two different flow control schedules in response to essentially a single control input dictating position of a valve member with respect to a valve seat.

SUMMARY OF THE INVENTION

It is the principal object of the invention to provide a new and improved multiple schedule valve. More specifically, it is an object of the invention to provide a multiple schedule valve that is simple and reliable in construction.

An exemplary embodiment of the invention achieves the foregoing object in an assemblage including a valve member and a valve seat. Means mount the valve member and the valve seat for relative movement between positions wherein the space between the valve member and the valve seat is varied to thereby control the flow of fluid through the valve. A lever is connected to one of the valve member and the valve seat and means are provided to define a pivot for the lever. The pivot is remote from the point of connection of the lever to the associated valve component. A first actuator is connected to the lever for pivoting the same to thereby move the valve component connected thereto relative to the other to provide the desired flow control. A second actuator is connected to the pivot defining means for shifting the pivot axis thereof. As a consequence, one of the actuators may be moved to a desired position to select the schedule of operation of the valve while the other may be moved to dictate the relative positions of the valve member and the valve seat according to any selected schedule.

In a preferred embodiment the lever is a bell crank. Links may be employed to connect the bell crank to one of the actuators and to the valve and preferably, the valve member is mounted for reciprocal, linear movement toward and away from the valve seat.

In a highly preferred embodiment, the pivot is defined by a shaft and the ends of the bell crank are defined by arms secured to the shaft at axially spaced locations and which extend radially therefrom.

The valve seat may be disposed in a conduit and one of the actuators may be a fluid operated motor which is connected via a fluid passage to the conduit upstream of the valve seat. A control valve may be located in the fluid passage for alternatively venting the motor while closing the passage or opening the passage.

Other objects and advantages will become apparent from the following specification taken in connection with the accompanying drawings.

DESCRIPTION OF THE PREFERRED EMBODIMENT

Figure 1:
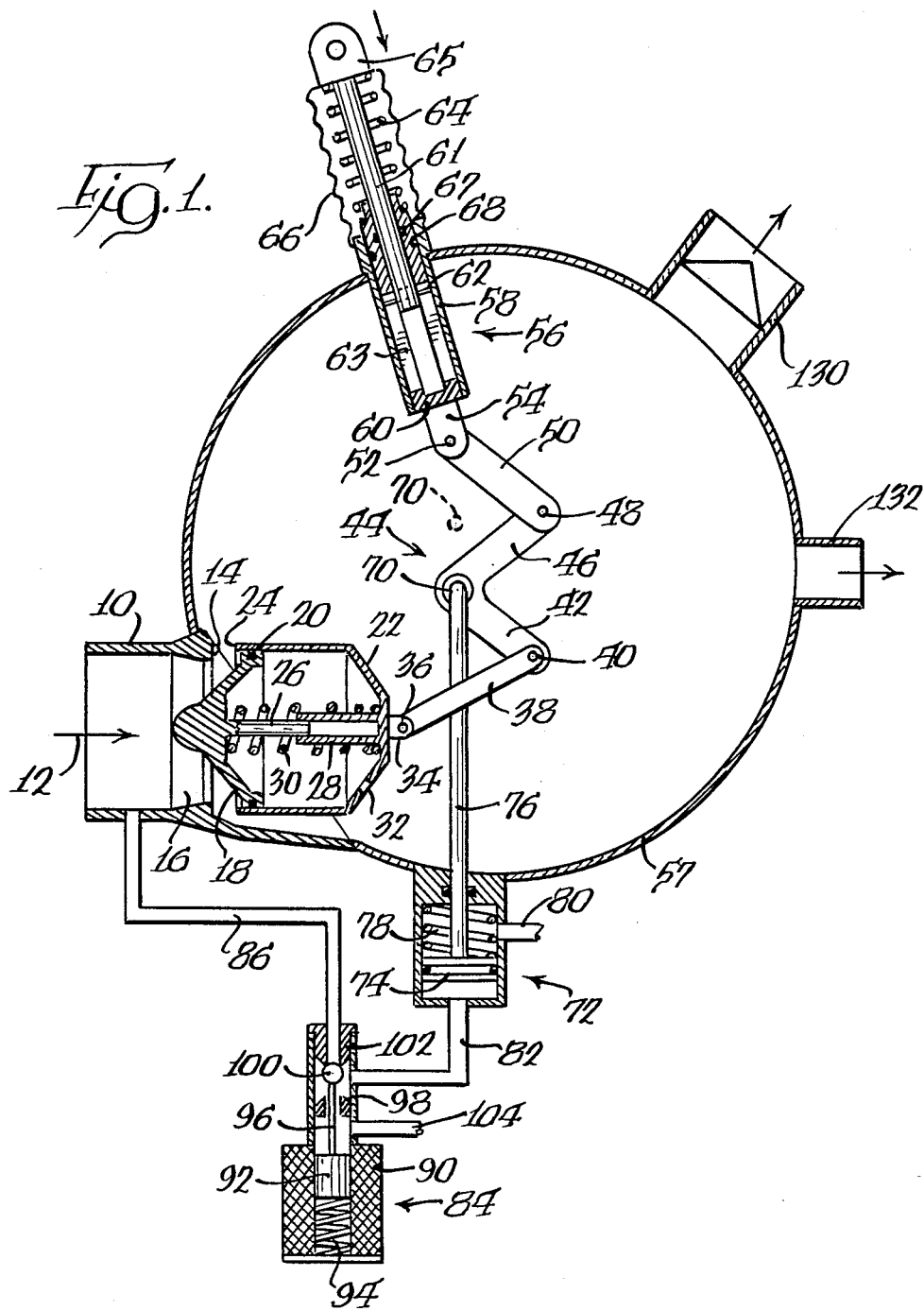
FIG. 1 is a somewhat schematic, sectional view of a multiple schedule valve made according to the invention.

An exemplary embodiment of a multiple schedule valve is illustrated in the drawings and with reference to FIG. 1 is seen to include a conduit 10 through which fluid may flow in the direction of an arrow 12. The conduit 10 may form part of the valve body for a valve to be described and include a valve seat 14. Immediately upstream of the valve seat 14 and within the conduit 10 are diametrical webs 16 which mount an imperforate cone 18 having its apex facing the direction of air flow 12.

The cone 18, at its base, includes a peripheral seal 20 which sealingly engages the interior of a bell-shaped valve member 22. The valve member 22 is thus reciprocally mounted for straight line movement toward and away from the valve seat 14 with the periphery 24 of the valve member being adapted to seal against the seat 14.

To assist in guiding the valve member 22 in such path of movement, the cone 18 includes a central post 26 extending toward the valve member 22 to be slidably received in a sleeve 28 and formed on the interior of the valve member 22. A compression coil spring 30 may be disposed about the post 26 and the sleeve 28 and interposed between the cone 18 and the valve member 22 for the purpose of biasing the latter toward an open position.

A vent 32 may be formed in the valve member 22 at a location remote from the sealing contact provided by the seal 20 so as to allow fluid to freely enter or exit the interior space defined by the valve member 22 and the cone 28 thereby essentially pressure balancing the valve member 22.

Centrally of the valve member 22, and on the exterior thereof, the same is provided with an apertured ear 34 for receiving a pivot pin 36 which is in turn adapted to pivotally connect the valve member 22 to a link 38 at one end thereof. The opposite end of the link 38 is connected via a pivot pin 40 to one arm 42 of a bell crank, generally designated 44.

The other arm 46 of the bell crank 44 is pivoted as by a pin 48 to a link 50 which in turn is pivoted by a pivot pin 52 to an apertured tongue 54 forming part of an actuator, generally designated 56.

A generally cylindrical housing 57 is in fluid communication with the downstream side of the valve seat 14 and houses virtually all of the previously described components save for the diametrical web 16 and the conduit 10. The same also mounts a radially directed tube 58 forming part of the actuator 56.

The tube 58 serves as a guide for a piston-like element 60 which mounts the ears 54. The piston-like element 60 is tubular to receive an actuator rod 61 having a transverse pin 62 guided in slots 63 in the piston 60. A compression coil spring 64 is disposed between the radially outer end of the piston 60 and a clevis 65 at the end of the actuator rod 61. A bellows-like structure 66 encloses the compression coil spring 64 and seals 67 and 68 provide a seal to prevent any fluid under pressure within the housing 57 from exiting the same via interior components of the first actuator 56.

The actuator rod 61 has a uniform length of stroke and the structure associated therewith provides a lost-motion connection when the valve member 22 moves to a closed position prior to the end of the stroke of the actuator rod 61.

Returning to the bell crank 44, intermediate the ends of the arms 42 and 46, the same is provided with a pivot 70. As will be seen in greater detail hereinafter, the pivot axis defined by the pivot 70 is movable from the solid line position shown in FIG. 1 to a dotted line position shown in the same figure. Such movement is effected by reason of a connection of the pivot 70 to a second actuator, generally designated 72. The second actuator 72 is a fluid motor, and more specifically, a single acting fluid cylinder provided with a spring return. The second actuator 72 includes an internal piston 74 connected by a rod 76 to the pivot 70. The spring return is provided by a weak internal compression coil spring 78 and the coil spring side of the piston 74 is normally vented by a vent 80.

The side of the piston 74 opposite the coil spring 78 includes a fluid inlet on a line 82. The line 82 is connected to a control valve, generally designated 84. Depending upon the state of operation of the control valve 84, the line 82 may either be vented or connected in fluid communication with a conduit 86 extending to the conduit 10 on the upstream side of the valve seat 14.

To accomplish this, the control valve 84 is a solenoid valve including a coil 90 which may be energized as desired and an armature 92 biased by a compression coil spring 94 to the position illustrated in FIG. 1. A rod 96 extends through a valve seat 98 to normally urge a spherical valve member 100 against a second valve seat 102 to close off the inlet 82 from the conduit 86 and at the same time allow the conduit 82 to be vented through the valve seat 98 to a vent passage 104. When the coil 90 is energized, the valve member 100 will close against the valve seat 98 to allow the second actuator to be pressurized by fluid from the conduit 10.

Figure 2:
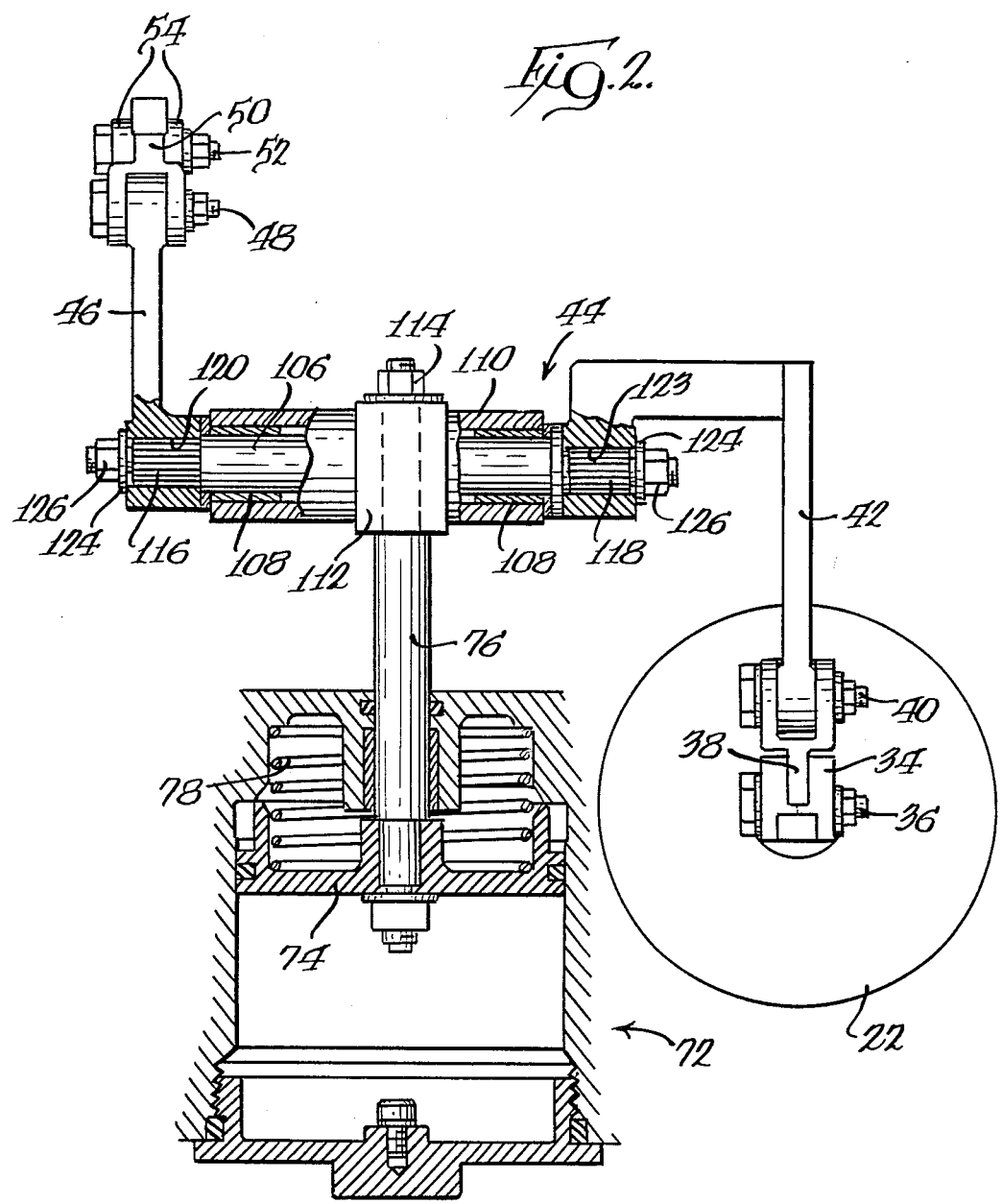
FIG. 2 is an enlarged fragmentary view of an actuator, lever in the form of a bell crank, and valve member employed in the invention.

Turning now to FIG. 2, the linkage system just described will be seen in greater detail. In particular, it will be seen that the bell crank 44 is defined by an elongated shaft 106 journalled by bearings 108 within the interior of an elongated sleeve 110. The rod 76 from the second actuator 72 terminates in a yoke 112 disposed about the sleeve 110 and secured thereto by a threaded connection including nuts 114.

Splined ends 116 and 118 of the shaft 106 extend from opposite ends of the sleeve 110 to be received in splined apertures 120 and 122 respectively in the links 46 and 42. Washers 124 and retaining bolts 126 provide for axial retention of the arms 42 and 46 on the respective ends of the shaft 106 while the splined connections assure that the arms 42 and 46 will rotate with the shaft 106.

Returning now to FIG. 1, the housing 57 may be provided with one or more outlets 130 and 132. Where the valve is employed in aircraft for the purposes alluded to previously, the outlet 130 may be utilized when compressor section unloading during start-up is to be accomplished whereas the outlet 132 may be utilized to direct bleed air to anti-icing equipment.

Figure 3:
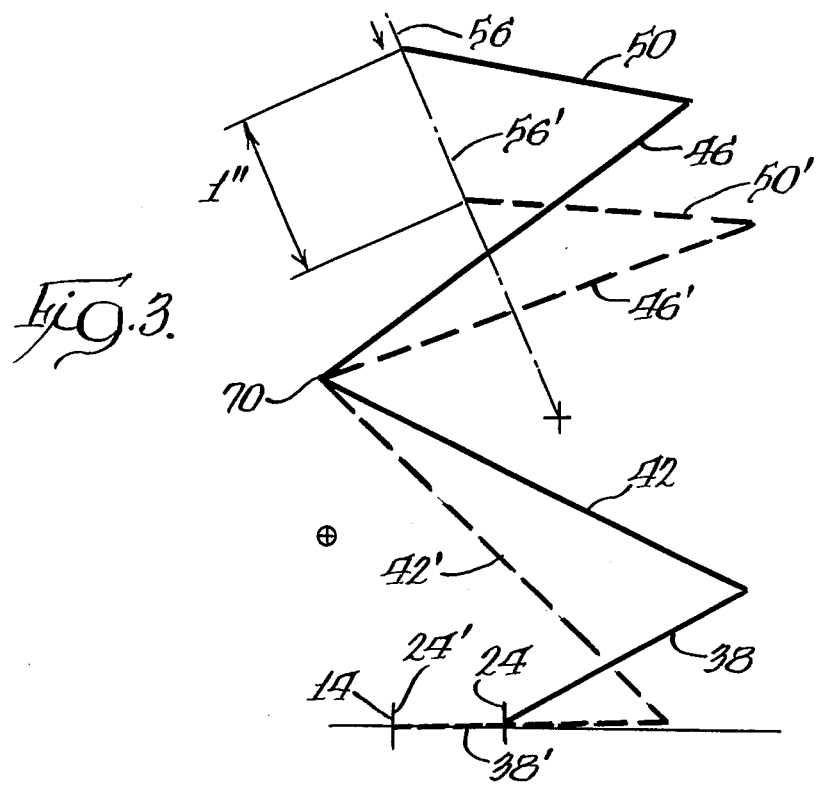
FIG. 3 is a schematic illustrating valve movement when operated according to one schedule of operation of which the valve is capable.

Operation of the apparatus according to two different schedules will now be described in connection with FIGS. 1, 3 and 4. FIG. 3 illustrates schematically the variance in positions of the various components for a one inch stroke of the first actuator 56 when the second actuator 72 has been pressurized. In other words, the rod 76 has been extended to move the pivot 70 to the dotted line position illustrated in FIG. 1. In the case of utilization in an aircraft for the purposes mentioned previously, such a configuration might be utilized in unloading a compressor section to facilitate start-up of an engine. The various components of the linkages are given the same reference numerals as in FIGS. 1 and 2 and for a zero stroke of the first actuator 56, the solid line positions are shown. When the actuator 56 has been extended one inch into the housing 57, the dotted line position provided with primed reference numerals is assumed. It will be seen that for such operation, the sealing edge 24 of the valve member 22 moves from a full open to a full closed position against the seat 14.

In this operation, the actuator rod 61 has moved two inches and through the compression coil spring 64 the piston 60 is also caused to move but after movement of piston 60 is stopped by closing of the valve the actuator rod 61 can continue to move as permitted by the lost-motion connection.

Figure 4:
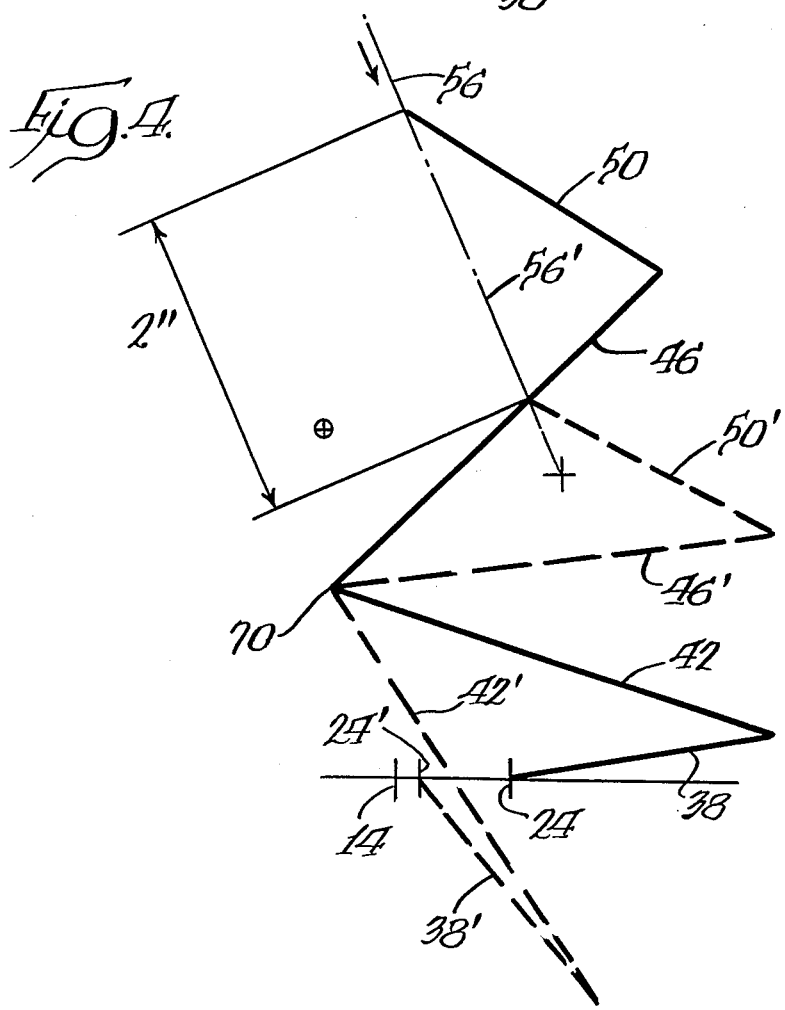
FIG. 4 is a view similar to FIG. 3 showing valve movement for another schedule of valve operation.

FIG. 4 is similar in its depiction to FIG. 3 but illustrates the location of components when the second actuator 72 is being vented. The solid line depiction in FIG. 4 illustrates the position of the various linkage components for a zero stroke condition of the actuator 56 whereas the dotted line indication utilizing primed reference numerals shows the location of the corresponding components after the actuator 56 has undergone a two inch stroke toward the interior of the housing 57. It will be seen that in this instance, even though the stroke of the actuator 56 is greater, the sealing edge 24 of the valve member 22 has not moved to completely seal against the seat 14. For a one inch stroke, the degree of openness of the valve components would be even larger than that depicted by FIG. 4.

Thus, the present invention provides two differing valve schedules for flow control provided by the valve 22. A greater number could be achieved by providing additional locations for the pivot 70 between the extremes illustrated. It will also be appreciated that essentially only one control input is required, namely, that at the actuator 56. Of course, it is necessary to provide a selection of schedules by operation of the valve 84 but the actual control of the position of the valve member 22 according to any schedule selected is effected by the first actuator 56.

It will be further appreciated that the multiple schedule valve of the invention is extremely simple in nature and accordingly, highly reliable. The simplicity not only contributes to such reliability, but when the system is employed in an aircraft, provides a weight savings as well.

I claim:

1. A multiple schedule valve comprising:
    a fluid conduit including a valve seat;
    a valve member;
    means mounting said valve member for movement toward and away from said valve seat to vary the flow of fluid through said conduit;
    first and second actuators; and
    a bell crank for moving said valve member and having first and second ends, link means pivotally connecting one of said ends to the first actuator and the other of said ends to said valve member, and a pivot for said bell crank intermediate said first and second ends and connected to said second actuator so that the axis of said pivot may be changed in response to operation of said second actuator.

2. The multiple schedule valve of claim 1 wherein said valve member is mounted for reciprocal, linear movement toward and away from said valve seat.

3. The multiple schedule valve of claim 1 wherein said pivot is defined by a shaft and said ends are defined by arms secured to said shaft at axially spaced locations and extending radially therefrom.

4. The multiple schedule valve of claim 1 wherein one of said actuators is a fluid operated motor and further including a fluid passage connected to said conduit upstream of said valve seat and extending to said motor.

5. The multiple schedule valve of claim 4 further including a control valve in said fluid passage for alternatively
    (a) venting said motor while closing said passage and
    (b) opening said passage.

6. The multiple schedule valve of claim 1 wherein said first actuator is adapted to provide valve movement control and said second actuator is adapted to provide valve schedule control.

7. A multiple schedule valve comprising:
    a valve member;
    a valve seat;
    means mounting said valve member and said valve seat for relative movement between positions wherein the space between said valve member and said valve seat is varied;
    a lever means including a bell crank pivotally connected to one of said valve members and said valve seat;
    means defining a pivot for said lever means said pivot being remote from the point of connection of said lever means to said one of said valve members and said valve seat;
    a first actuator connected to said lever means for pivoting the same to thereby move said one of said valve members and said valve seat relative to the other of said valve member and said valve seat; and
    a second actuator connected to said pivot defining means for shifting the pivot axis thereof.

8. The multiple schedule valve of claim 7 wherein one of said actuators comprises a single acting, spring return fluid cylinder.

9. The multiple schedule valve of claim 7 wherein one of said actuators comprises a push rod.

10. The multiple schedule valve of claim 7 wherein said pivot means is disposed between the ends of said bell crank, said first actuator being pivotally connected to one end of said bell crank by a link, the other end of said bell crank being pivotally connected to said one of said valve member and said valve seat by a link, and said second actuator being connected to said pivot means by an elongated rod.

11. The multiple schedule valve of claim 10 wherein said pivot is defined by a shaft and said ends are defined by arms secured to said shaft at axially spaced locations and extending radially therefrom, said arms being pivotally connected to respective ones of said links.

12. The multiple schedule valve of claim 7 wherein said first actuator includes a lost motion connection.

13. The multiple schedule valve of claim 7 wherein said first actuator includes an actuator rod having a uniform length of stroke, and a lost-motion connection associated with said actuator rod to permit over-travel of said actuator rod when the valve member engages the valve seat prior to the end of said stroke.

14. A multiple schedule valve having two different valve schedules for flow control comprising, a first actuator movable through a variable stroke, a valve member having a full stroke of predetermined length in moving between closed and fully open positions, linkage means including a bell crank interconnecting said first actuator and said valve member such that a predetermined length of stroke of the first actuator effects said full stroke of the valve member, said linkage means being pivotally connected to said valve member, a second actuator, and means responsive to operation of the second actuator to modify the action of said linkage means to vary the relation between the first actuator and the valve member to have the valve member move through less that a full stroke in response to movement of the first actuator through said predetermined length of stroke.

* * * * *